(12) United States Patent
Rajan et al.

(10) Patent No.: US 7,882,192 B2
(45) Date of Patent: Feb. 1, 2011

(54) DETECTING SPAM EMAIL USING MULTIPLE SPAM CLASSIFIERS

(75) Inventors: Vadakkedathu T. Rajan, Yorktown Heights, NY (US); Mark N. Wegman, Yorktown Heights, NY (US); Richard B. Segal, Yorktown Height, NY (US); Jason L. Crawford, Yorktown Heights, NY (US); Jeffrey O. Kephart, Yorktown Heights, NY (US); Shlomo Hershkop, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/541,843

(22) Filed: Aug. 14, 2009

(65) Prior Publication Data

US 2009/0307771 A1    Dec. 10, 2009

Related U.S. Application Data

(63) Continuation of application No. 11/029,069, filed on Jan. 4, 2005, now abandoned.

(51) Int. Cl.
*G06F 15/16* (2006.01)

(52) U.S. Cl. .................. 709/206; 709/223; 715/501.1; 382/103; 382/159; 348/153

(58) Field of Classification Search ............... 709/206, 709/223; 715/501.1; 382/103, 159; 348/153
See application file for complete search history.

(56) References Cited

U.S. PATENT DOCUMENTS

| 7,292,723 | B2 * | 11/2007 | Tedesco et al. | 382/159 |
|---|---|---|---|---|
| 2005/0060643 | A1 * | 3/2005 | Glass et al. | 715/501.1 |
| 2005/0262210 | A1 * | 11/2005 | Yu | 709/206 |

* cited by examiner

*Primary Examiner*—Tammy T Nguyen
(74) *Attorney, Agent, or Firm*—Michael J. Buchenhomer; Vazken Alexanian

(57) ABSTRACT

A method for detecting undesirable emails combines input from two or more spam classifiers to provide improved classification effectiveness and robustness. The method includes obtaining a score from each of a plurality of constituent spam classifiers by applying them to a given input email. The method further includes obtaining a combined spam score from a combined spam classifier that takes as input the plurality of constituent spam classifier scores, the combined spam classifier being computed automatically in accordance with a specified false-positive vs. false-negative tradeoff. The method further includes identifying the given input email as an undesirable email if the combined spam score indicates that the input e-mail is undesirable.

18 Claims, 12 Drawing Sheets

From: sales@netpharma.com

To: john@company.com

Date: April 4, 2004

Subject: New over-the-counter drug fights any disease!!! Buy now!!!

Hi! I want to tell you about a brand new drug that fights any disease known to man. This new over-the-counter drug has been proven to fight any kind of ailment known to man. You can buy it now for the low price of $19.99. Don't lose this opportunity to enrich your life and better your health! Visit our web site to get this drug today! www.superdrug.com

FIG. 2

DETECTING SPAM EMAIL USING MULTIPLE SPAM CLASSIFIERS

CROSS-REFERENCE TO RELATED APPLICATIONS

This application is a continuation of commonly-owned, co-pending U.S. application Ser. No. 11/029,069, filed Jan. 4, 2005, which is incorporated by reference in its entirety as if fully set forth herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of electronic mail or e-mail and more particularly relates to the field of detecting and eliminating unsolicited e-mail or spam.

BACKGROUND OF THE INVENTION

The emergence of electronic mail, or e-mail, has changed the face of modern communication. Today, millions of people every day use e-mail to communicate instantaneously across the world and over international and cultural boundaries. The Nielsen polling group estimates that the United States alone boasts 183 million e-mail users out of a total population of 280 million. The use of e-mail, however, has not come without its drawbacks.

Almost as soon as e-mail technology emerged, so did unsolicited e-mail, also known as spam. Unsolicited e-mail typically comprises an e-mail message that advertises or attempts to sell items to recipients who have not asked to receive the e-mail. Most spam is commercial advertising for products, pornographic web sites, get-rich-quick schemes, or quasi-legal services. Spam costs the sender very little to send—most of the costs are paid for by the recipient or the carriers rather than by the sender. Reminiscent of excessive mass solicitations via postal services, facsimile transmissions, and telephone calls, an e-mail recipient may receive hundreds of unsolicited e-mails over a short period of time.

On average, Americans receive 155 unsolicited messages in their personal or work e-mail accounts each week with 20 percent of e-mail users receiving 200 or more. This results in a net loss of time, as workers must open and delete spam e-mails. Similar to the task of handling "junk" postal mail and faxes, an e-mail recipient must laboriously sift through his or her incoming mail simply to sort out the unsolicited spam e-mail from legitimate e-mails. As such, unsolicited e-mail is no longer a mere annoyance—its elimination is one of the biggest challenges facing businesses and their information technology infrastructure. Technology, education and legislation have all taken roles in the fight against spam.

Presently, a variety of methods exist for detecting, labeling and removing spam. Vendors of electronic mail servers, as well as many third-party vendors, offer spam-blocking software to detect, label and sometimes automatically remove spam. The following U.S. patents, which disclose methods for detecting and eliminating spam, are hereby incorporated by reference in their entirety: U.S. Pat. No. 5,999,932 entitled "System and Method for Filtering Unsolicited Electronic Mail Messages Using Data Matching and Heuristic Processing," U.S. Pat. No. 6,023,723 entitled "Method and System for Filtering Unwanted Junk E-Mail Utilizing a Plurality of Filtering Mechanisms," U.S. Pat. No. 6,029,164 entitled "Method and Apparatus for Organizing and Accessing Electronic Mail Messages Using Labels and Full Text and Label Indexing," U.S. Pat. No. 6,092,101 entitled "Method for Filtering Mail Messages for a Plurality of Client Computers Connected to a Mail Service System," U.S. Pat. No. 6,161,130 entitled "Technique Which Utilizes a Probabilistic Classifier to Detect Junk E-Mail by Automatically Updating A Training and Re-Training the Classifier Based on the Updated Training List," U.S. Pat. No. 6,167,434 entitled "Computer Code for Removing Junk E-Mail Messages," U.S. Pat. No. 6,199,102 entitled "Method and System for Filtering Electronic Messages," U.S. Pat. No. 6,249,805 entitled "Method and System for Filtering Unauthorized Electronic Mail Messages," U.S. Pat. No. 6,266,692 entitled "Method for Blocking All Unwanted E-Mail (Spam) Using a Header-Based Password," U.S. Pat. No. 6,324,569 entitled "Self-Removing E-mail Verified or Designated as Such by a Message Distributor for the Convenience of a Recipient," U.S. Pat. No. 6,330,590 entitled "Preventing Delivery of Unwanted Bulk E-Mail," U.S. Pat. No. 6,421,709 entitled "E-Mail Filter and Method Thereof," U.S. Pat. No. 6,484,197 entitled "Filtering Incoming E-Mail," U.S. Pat. No. 6,487,586 entitled "Self-Removing E-mail Verified or Designated as Such by a Message Distributor for the Convenience of a Recipient," U.S. Pat. No. 6,493,007 entitled "Method and Device for Removing Junk E-Mail Messages," and U.S. Pat. No. 6,654,787 entitled "Method and Apparatus for Filtering E-Mail."

One known method for eliminating spam employs similarity detection. In one typical implementation of similarity-based methods, a large number of "decoy" or "honey pot" e-mail accounts associated with fictitious users are deployed, and the e-mail addresses are publicized to attract spammers. Any e-mails that are received by these e-mail accounts are deemed automatically to be, by definition, unsolicited e-mails, or spam. These spam e-mails are aggregated into a spam e-mail corpus. Alternatively, the spam e-mail corpus can be formed by aggregating e-mails that users have voted as spam. A similarity detection method examines incoming e-mail, comparing it with each spam e-mail in the corpus. If there is a sufficient degree of match with one or more e-mails in the spam corpus, the e-mail is deemed to be spam and dealt with accordingly; otherwise the e-mail is not deemed to be spam, and is treated normally.

Unfortunately, spammers frequently invent new twists designed to circumvent commonly used similarity detectors, including adding, deleting, or modifying content of e-mails to make them superficially different. This forces the authors of similarity-based filters to respond in kind with enhancements designed to capture the underlying similarity of the spammer's e-mail messages, and the arms race cycle begins anew.

Other known methods for eliminating spam include rule-based methods based on information in the e-mail header and body, of which whitelists and blacklists are a simple example. Other known methods include Bayesian classifiers, as well as other statistical methods based on support vector machines and decision trees. However, just as is the case for similarity-based detection methods, spammers can usually find ways to elude any of these techniques, at least temporarily until the anti-spam methods can adapt to the new innovations of the spammers. This introduces a time window during which users can be inundated with spam e-mail. Since different spammers are continually finding innovative techniques that temporarily weaken the effectiveness of anti-spam filtration techniques, users can receive an unacceptably high amount of spam in their inboxes.

In short, there is no one anti-spam technique that can long withstand determined attack by spammers, resulting in a higher overall rate of spam. Therefore, a need exists to overcome the problems with the prior art as discussed above, and particularly for a way to improve both the effectiveness of spam filtration and the robustness of spam filtration against continued innovation by spammers.

SUMMARY OF THE INVENTION

Briefly, according to an embodiment of the present invention, a method for detecting whether a first e-mail is undesirable is disclosed. The method includes inputting the first e-mail to each of a plurality of constituent spam classifiers and obtaining at least one score from each of the plurality of constituent spam classifiers indicating the degree to which the first e-mail is deemed spam. The method further includes obtaining a combined spam score from a combined spam classifier that takes as input the at least one score from the plurality of constituent spam classifiers, the combined spam classifier being computed automatically in accordance with a false-positive vs. false-negative tradeoff. The method further includes identifying the first e-mail as an undesirable e-mail if the combined spam score indicates that the first e-mail is undesirable.

According to another embodiment of the present invention, a method for detecting whether a first e-mail is undesirable is disclosed. The method includes inputting the first e-mail to a classifier and obtaining from the classifier a classification of the first e-mail, wherein a range of classifications includes a first classification indicating that the first e-mail cannot be classified as either spam or non-spam. The method further includes taking an action if the first e-mail is classified under the first classification.

According to another embodiment of the present invention, a method for detecting undesirable e-mail is disclosed. The method includes inputting a first e-mail to each of a plurality of constituent spam classifiers and obtaining at least one score from each of the plurality of constituent spam classifiers indicating the degree to which the first e-mail is deemed spam. The method further includes obtaining a combined spam score from a combined spam classifier that takes as input the at least one score from each of the plurality of constituent spam classifiers, at least one of the plurality of constituent spam classifiers being a member of a similarity-detection family. The method further includes identifying the first e-mail as an undesirable e-mail if the combined spam score indicates that the first e-mail is undesirable.

In another embodiment of the present invention, an information processing system for detecting whether a first e-mail is undesirable is disclosed. The information processing system includes a processor configured for inputting the first e-mail to each of a plurality of constituent spam classifiers, obtaining at least one score from each of the plurality of constituent spam classifiers indicating the degree to which the first e-mail is deemed spam, obtaining a combined spam score from a combined spam classifier that takes as input the at least one score from the plurality of constituent spam classifiers, the combined spam classifier being computed automatically in accordance with a false-positive vs. false-negative tradeoff and identifying the first e-mail as an undesirable e-mail if the combined spam score indicates that the first e-mail is undesirable.

In another embodiment of the present invention, a computer readable medium including computer instructions for detecting whether a first e-mail is undesirable is disclosed. The computer readable medium includes inputting the first e-mail to each of a plurality of constituent spam classifiers and obtaining at least one score from each of the plurality of constituent spam classifiers indicating the degree to which the first e-mail is deemed spam. The computer readable medium further includes obtaining a combined spam score from a combined spam classifier that takes as input the at least one score from the plurality of constituent spam classifiers, the combined spam classifier being computed automatically in accordance with a false-positive vs. false-negative tradeoff. The computer readable medium further includes identifying the first e-mail as an undesirable e-mail if the combined spam score indicates that the first e-mail is undesirable.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 2 is an illustration of an e-mail viewed in a graphical user interface, showing the generation of tokens for an e-mail, according to one embodiment of the present invention.

Figure 1:
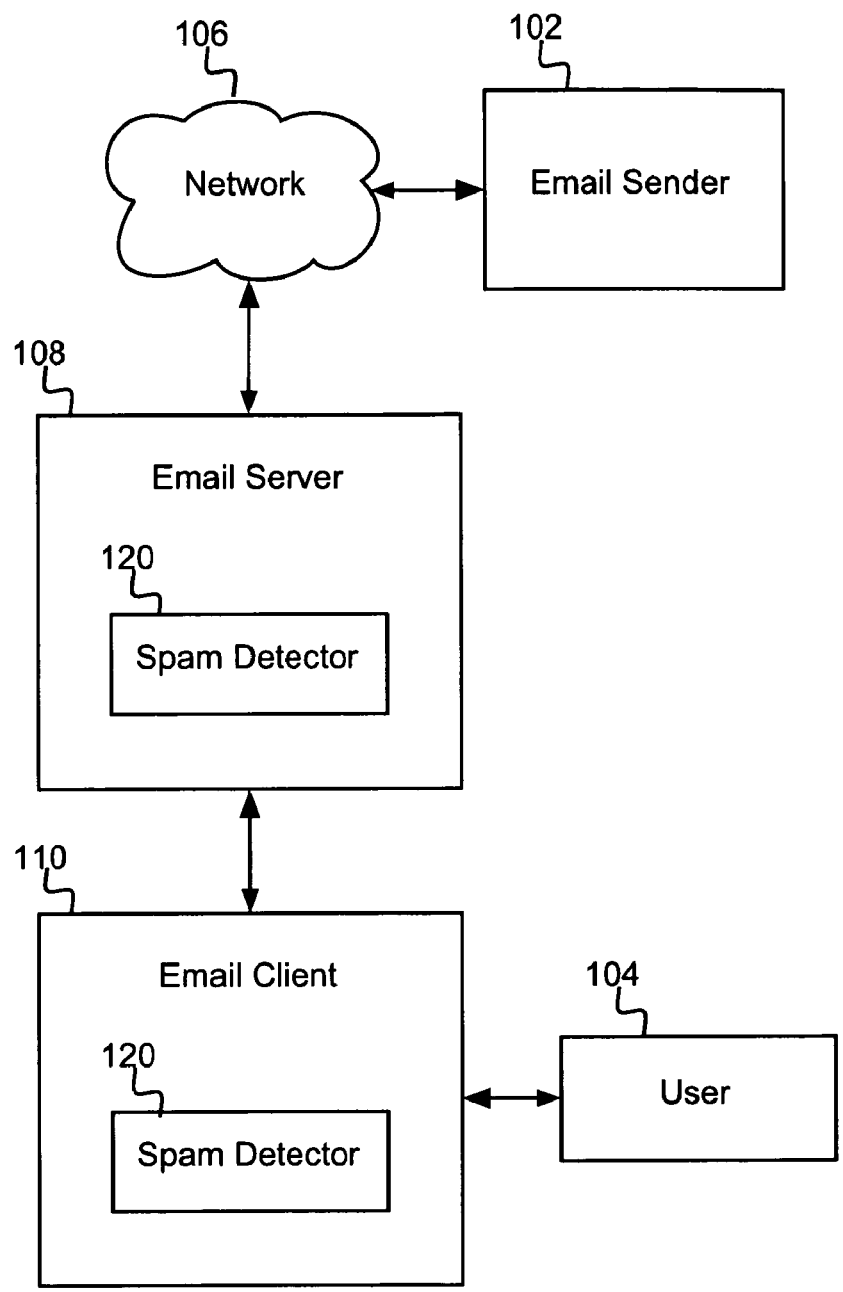
FIG. 1 is block diagram showing the network architecture of one embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

FIG. 1 is a block diagram showing a high-level network architecture according to an embodiment of the present invention. FIG. 1 shows an e-mail server 108 connected to a network 106. The e-mail server 108 provides e-mail services to a local area network (LAN) and is described in greater detail below. The e-mail server 108 comprises any commercially available e-mail server system that can be programmed to offer the functions of the present invention. FIG. 1 further shows an e-mail client 110, comprising a client application running on a client computer, operated by a user 104. The e-mail client 110 offers an e-mail application to the user 104 for handling and processing e-mail. The user 104 interacts with the e-mail client 110 to read and otherwise manage e-mail functions.

FIG. 1 further includes a spam detector 120 for processing e-mail messages and detecting unsolicited, or spam, e-mail, in accordance with one embodiment of the present invention. The spam detector 120 can be implemented as hardware, software or any combination of the two. Note that the spam detector 120 can be located in either the e-mail server 108 or the e-mail client 110 or therebetween. Alternatively, the spam detector 120 can be located in a distributed fashion in both the e-mail server 108 and the e-mail client 110. In this embodiment, the spam detector 120 operates in a distributed computing paradigm.

FIG. 1 further shows an e-mail sender 102 connected to the network 106. The e-mail sender 102 can be an individual, a corporation, or any other entity that has the capability to send an e-mail message over a network such as network 106. The path of an e-mail in FIG. 1 begins, for example, at e-mail sender 102. The e-mail then travels through the network 106 and is received by a e-mail server 108, where it is optionally processed according to the present invention by the spam detector 120. Next, the processed e-mail is sent to the recipient, e-mail client 110, where it is optionally processed by the spam detector 120 and eventually viewed by the user 104. This process is described in greater detail with reference to FIG. 5 below.

In an embodiment of the present invention, the computer systems of the e-mail client 110 and the e-mail server 108 are one or more Personal Computers (PCs) (e.g., IBM or compatible PC workstations running the Microsoft Windows operating system, Macintosh computers running the Mac OS operating system, or equivalent), Personal Digital Assistants (PDAs), hand held computers, palm top computers, smart phones, game consoles or any other information processing devices. In another embodiment, the computer systems of the e-mail client 110 and the e-mail server 108 are a server system (e.g., SUN Ultra workstations running the SunOS operating system or IBM RS/6000 workstations and servers running the AIX operating system). The computer systems of the e-mail client 110 and the e-mail server 108 are described in greater detail below with reference to FIG. 6.

In another embodiment of the present invention, the network 106 is a circuit switched network, such as the Public Service Telephone Network (PSTN). In yet another embodiment, the network 106 is a packet switched network. The packet switched network is a wide area network (WAN), such as the global Internet, a private WAN, a telecommunications network or any combination of the above-mentioned networks. In yet another embodiment, the network 106 is a wired network, a wireless network, a broadcast network or a point-to-point network.

It should be noted that although e-mail server 108 and e-mail client 110 are shown as separate entities in FIG. 1, the functions of both entities may be integrated into a single entity. It should also be noted that although FIG. 1 shows one e-mail client 110 and one e-mail sender 102, the present invention can be implemented with any number of e-mail clients and any number of e-mail senders.

The present invention is directed towards the use of multiple spam classifiers to detect spam e-mail. Specifically, the present invention provides a method for combining spam classifiers to result in a spam classifier that is better at detecting spam and more robust to attack by spammers. It has been seen that if each classifier measures a different characteristic of an input e-mail, then the combined classifier can often give better results. This patent application discusses different types of classifiers used in spam detection and how their output can be combined to yield a more effective classifier.

The first class of spam classifier discussed involves tokenizing a spam corpus and comparing these tokens to an incoming e-mail. The use of the first class of spam classifier to detect spam is discussed in greater detail below with reference to FIGS. 2-5 below. The second class of spam classifier discussed involves comparing tokens of an incoming e-mail to tokens in e-mail known to be spam. The use of the second class of spam classifier to detect spam is discussed in greater detail below with reference to FIG. 6 below. The third class of spam classifier discussed involves using certain information of an incoming e-mail, such as the last routed server, to detect spam. The use of the third class of spam classifier to detect spam is discussed in greater detail below with reference to FIG. 7 below.

A token is a unit representing data or metadata of an e-mail or group of e-mails. A token can be a string of contiguous characters (of fixed or non-fixed length) from an e-mail. A token may also comprise a string of characters from an e-mail, wherein a hash of the characters meet a criterion, such as the hash ending in "00." A k-gram is one form of a token. A k-gram is a string of "k" consecutive data components. The use of k-grams for document matching is well known. See Aiken, Alex (2003). Winnowing: Local Algorithms for Document Fingerprinting, In Proceedings of the ACM SIGMOD International Conference on Management of Data. Techniques presently exist for developing k-grams as constituting a substring of k characters from text. K-grams have been employed in text similarity matching, as well as in computer virus detection. U.S. Pat. No. 5,440,723 entitled "Automatic Immune System for Computers and Computer Networks" and U.S. Pat. No. 5,452,442 entitled "Methods and Apparatus for Evaluating and Extracting Signatures of Computer Viruses and Other Undesirable Software Entities," the disclosures of which are hereby incorporated by reference in their entirety, teach several methods for developing k-grams employed as signatures of known computer viruses. These patents likewise teach the development of "fuzzy" k-grams that provide further immunization from obfuscation sometimes employed by computer viruses upon their replication.

This first class of spam classifier is utilized by analyzing a corpus of spam and characterizing them using tokens. Then an incoming mail is analyzed and it is determined whether the incoming mail is similar to one of the e-mails in the spam corpus. One example of this kind of token classifier is the k-gram similarity classifier. Such classifiers can start with spam received by "honey-pots"—e-mail addresses that are known to receive only spam. They the incoming e-mail is analyzed and a similar e-mail in the spam corpus is sought. Only tokens that are common to a particular spam and the incoming e-mail are considered. Then a spam score based on the similarity is given. Often a collection of honey pots will receive several copies of the same spam e-mail, differing only slightly. The similarity algorithm can detect this phenomenon and use this information to better detect spam.

Additionally, the similarity algorithm can detect the fact that certain incoming e-mail is similar to other incoming e-mail. This would suggest that the given e-mail is part of a mass mailing, but does not tell whether the mass mailing is spam or legitimate mass mailing. But this information can also be used by the classifier to better detect spam. In general, this type of classifier uses information about the whole incoming e-mail and a particular spam or a closely related group of spam e-mails.

As discussed herein, a k-gram is a consecutive string of k bytes, or characters, from an e-mail, where k is a whole number. A k-gram can be considered a signature, or identifying feature, of an e-mail. FIG. 2 is an illustration of an e-mail 200 viewed in a graphical user interface, showing the generation of k-grams for the e-mail 200, according to one embodiment of the present invention. FIG. 2 shows a typical unsolicited e-mail 200 advertising a product. The e-mail 200 includes a header 202, which includes standard fields such as from, to, date and subject and a message body 204 that includes that the major advertising portion of the e-mail message.

FIG. 2 shows an example of several k-grams taken from the e-mail 200. K-gram 206 comprises nineteen consecutive characters that encompass the entire e-mail address of the sender. K-gram 208 comprises 44 consecutive characters that include data from the subject line of the e-mail 200. K-gram 210 comprises 46 consecutive characters from the body of the e-mail 200. K-gram 212 comprises 42 consecutive characters from the body of the e-mail 200. In an embodiment of the present invention, a k-gram consists of 20 to 30 consecutive characters from the e-mail 200, and one k-gram is generated for every 100 characters in an e-mail. In another embodiment of the present invention, a k-gram does not include white space. The generation of k-grams from an e-mail by spam detector 120 is described in greater detail below with reference to FIGS. 3-5.

It should be noted that the number of k-grams generated for an e-mail, as well as the size of each k-gram, is variable. That is, the number of k-grams generated for an e-mail and the size of each k-gram may vary or be dependant on other variables, such as: the number of spam e-mails in a spam corpus that must be processed for k-grams, the type of spam e-mails that must be processed, the number of incoming e-mails that must be processed for k-grams in order to determine whether they are spam, the amount and type of processing resources available, the amount and type of memory available, the presence of other, higher-priority processing jobs, and the like.

In addition to the generation of k-grams from e-mail 200, k-gram weight values can also be generated. That is, weight values are assigned to each k-gram depending on the relevance of each k-gram to the detection of a spam e-mail. For example, "from" e-mail addresses in unsolicited e-mail, such as reflected in k-gram 206, are often forged, or spoofed. Thus, the "from" e-mail address of e-mail 200 is probably not genuine. For this reason, k-gram 206 probably does not hold much relevance to the detection of spam. Therefore, a low k-gram weight value would be attributed to k-gram 206. On the other hand, information in the message body, such as reflected in k-gram 210, is often indicative of unsolicited e-mail. For this reason, k-gram 201 probably holds much relevance to the detection of spam. Therefore, a high k-gram weight value would be attributed to k-gram 210. In one embodiment of the present invention, k-gram weight values range from 0 to 1, with 0 being a low k-gram weight value and 1 being the highest k-gram weight value. In another embodiment of the present invention, the k-grams generated for an e-mail are fuzzy k-grams, which are better suited for detecting spam e-mail that has been disguised. In another embodiment of the present invention, k-gram weight values are associated with the length of the token, or k-gram. Since a token is a representation of data or metadata of en e-mail, the length of a token or k-gram represents an amount of data or metadata. For this reason, tokens or k-grams of greater length can be given greater weights.

Figure 3:
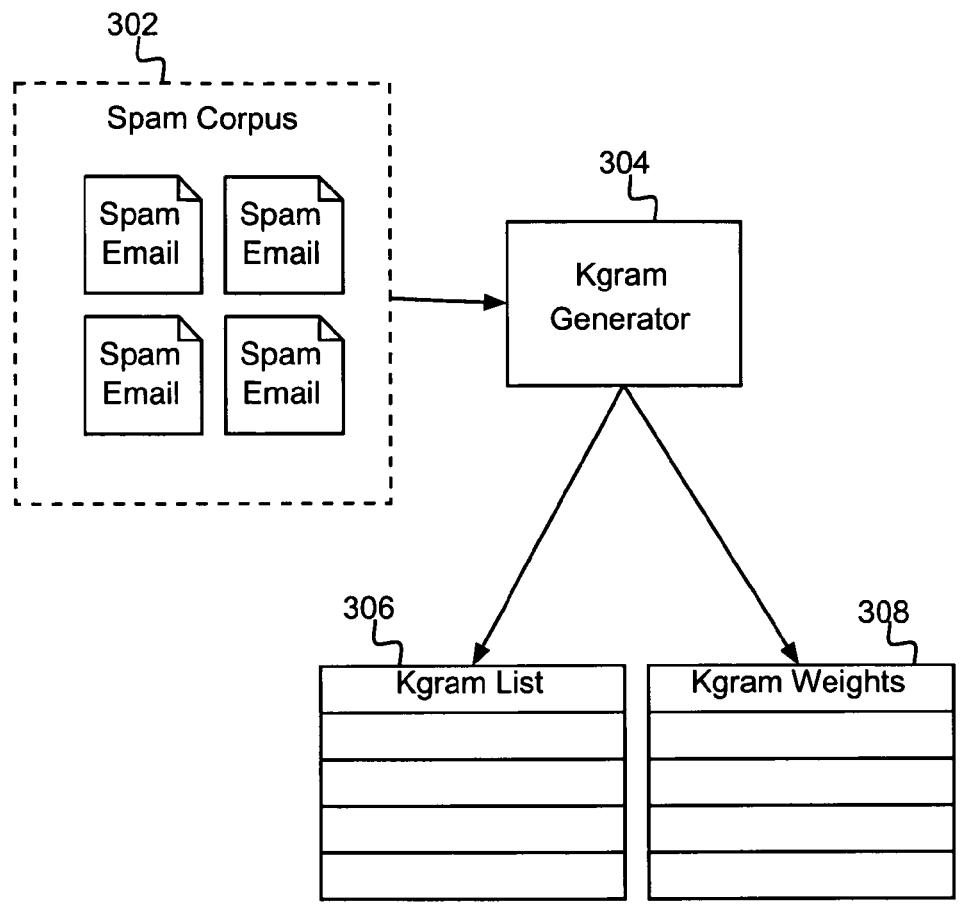
FIG. 3 is block diagram showing the generation of tokens from an unsolicited e-mail corpus, according to one embodiment of the present invention.

FIG. 3 is block diagram showing the generation of k-grams from an unsolicited e-mail corpus 302, according to one embodiment of the present invention. FIG. 3 shows a spam corpus 302 comprising a plurality of spam e-mails. The spam corpus 302 is used to learn how to identify spam e-mail and distinguish it from non-spam e-mail. In one embodiment of the present invention, a spam corpus is generated by creating a bogus e-mail account, perhaps belonging to a fictitious person, where no e-mails are expected or solicited. Thus, any e-mails that are received by this e-mail account are deemed automatically to be, by definition, unsolicited e-mails, or spam. This type of e-mail account is often referred to as a honey pot e-mail account or simply a honey pot. In another embodiment of the present invention, the spam corpus is generated or supplemented by reading a known set of unsolicited e-mails provided by a peer or other entity that has confirmed the identity of the e-mails as spam.

FIG. 3 also shows a k-gram generator 304, located in spam detector 120. The k-gram generator 304 generates k-grams from the spam corpus 302. For each spam e-mail in the spam corpus 302, the k-gram generator 304 generates at least one k-gram from the e-mail, as shown in FIG. 2. The process of generating k-grams from a spam e-mail is described in greater above with reference to FIG. 2. Once k-grams are generated for all e-mail in the spam corpus 302, an exhaustive k-gram list or database 306 is created. This k-gram list 306 includes all k-grams generated from the entire spam corpus 302. The k-gram list 306 acts like a dictionary for looking up k-grams from an incoming e-mail and determining whether it is a spam e-mail.

Additionally, for each k-gram in the k-gram list 306, the k-gram generator 304 can generate a k-gram weight value corresponding to a k-gram. The process of generating k-gram weight values for k-grams is described in greater above with reference to FIG. 2. Once k-gram weight values are generated for all k-grams in the k-gram list 306, an exhaustive list or database 308 of k-gram weight values is created. This k-gram weight value list 308 includes a k-gram weight corresponding to each k-gram in the k-gram list 306.

In one embodiment of the present invention, the undesirability of an e-mail, i.e., identifying an e-mail as spam, can be scored based on the weights of the e-mail tokens that match the tokens from a honey pot. In another alternative, the undesirability of an e-mail can be scored based on the number of the e-mail tokens that match the tokens from a honey pot.

Figure 4:
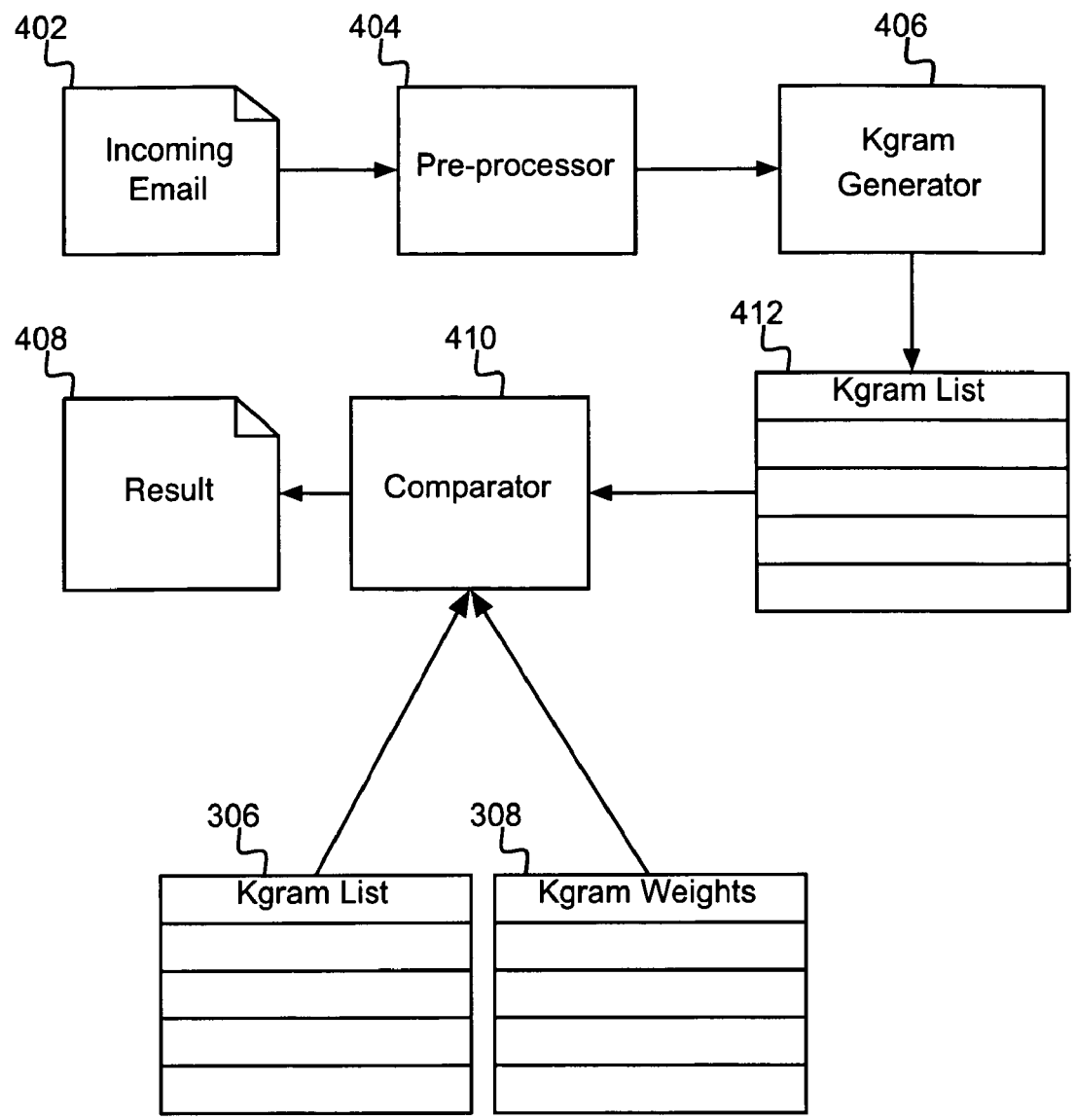
FIG. 4 is block diagram showing the process of detecting unsolicited e-mails using similarity calculations, according to one embodiment of the present invention.

FIG. 4 is block diagram showing the process of detecting unsolicited e-mails using similarity calculations, according to one embodiment of the present invention. FIG. 4 shows the process by which an incoming e-mail 402 is processed to determine whether it is a spam e-mail. FIG. 4 shows an optional pre-processor 404. Pre-processor 404 performs the tasks of pre-processing incoming e-mail 402 so as to eliminate spam-filtering countermeasures in the e-mail. Senders of spam e-mail often research spam-filtering techniques that are currently used and devise ways to counter them. For example, senders of spam may counter k-gram spam-filtering techniques by inserting various random characters in an e-mail so as to produce a variety of k-grams. The pre-processor 402 detects these spam-filtering countermeasures in the incoming e-mail 402 and eliminate them.

Below is a summary of techniques uses to eliminate the spam-filtering countermeasures used by spammers. MIME and HTML or an e-mail are decoded and the text the receiver views is analyzed. Thus, if the spammer inserts some text in very small or invisible font, those elements are ignored and only those elements that are in a large enough font to be visible to the mail receiver are analyzed. The e-mail as it is rendered is analyzed as well as in its original format. Also, commonly used changes to the same are mapped. Thus, "Viagra," and "vlagra" are taken to be the same token. Spaces and punctuation are removed. Thus, "v.i.a.g.r.a" and "v i a g r a" are both changed to "viagra".

After pre-processing by pre-processor 404, the e-mail 402 is read by a k-gram generator 406. The k-gram generator 406 generates a set of k-grams for the incoming e-mail, as described in greater detail above with reference to FIG. 2. This results in the creation of a k-gram list 412. This list is then read by the comparator 410, which compares the k-grams in k-gram list 412 with the k-grams in k-gram list 306. That is, for each k-gram in k-gram list 412, comparator 410 does a byte-by-byte (or character-by-character) comparison with each k-gram in the k-gram list 306. I.e., the comparator 410 chooses a k-gram pair—one k-gram from the k-gram list 412 and one from the k-gram list 306—and does a byte-by-byte comparison. The comparator 410 performs this action for every possible k-gram pair of k-grams from the lists 412 and 306.

In one embodiment of the present invention, the result 408 of the comparison process of the comparator 410 is a match if any of the following are true: 1) at least one k-gram pair is found to be identical, 2) a predefined number of k-gram pairs are found to be identical, 3) at least one k-gram pair is found to be substantially similar and 4) a predefined number of k-gram pairs are found to be substantially similar.

In yet another embodiment of the present invention, the comparison process of the comparator 410 involves the use of the k-gram weights from the k-gram weight value list 308. For each k-gram pair, a byte-by-byte comparison is performed, as described above. Then, it is determined which k-gram pairs are identical or substantially similar. For those k-gram pairs that are determined to be identical or substantially similar, the k-gram weight value (from the k-gram weight value list 308) that corresponds to the k-gram from list 306 is stored into a data structure. All such k-gram weight values that are stored into the data structure are then considered as a whole in determining whether the incoming e-mail 402 is spam e-mail. For example, all k-gram weight values that are stored into the data structure are added. If the resulting summation is greater than a threshold value, then the incoming e-mail 402 is spam e-mail. If the resulting summation is not greater than a threshold value, then the incoming e-mail 402 is not spam e-mail.

Weights may be used in various ways. In general, any function that combines the weights can be used, though some functions are more desirable than others. When two documents of significantly different size are analyzed in trying to determine whether one is a subset of the other, the sum of weights of the tokens that are common to the two documents may be considered and this result is divided by the sum of weights of the tokens in the longer document or the shorter document. Also considered are the weights of the most significant n tokens, where n is a number smaller than the number of tokens in either documents. Significant can be defined as the tokens with highest weight.

Figure 5:
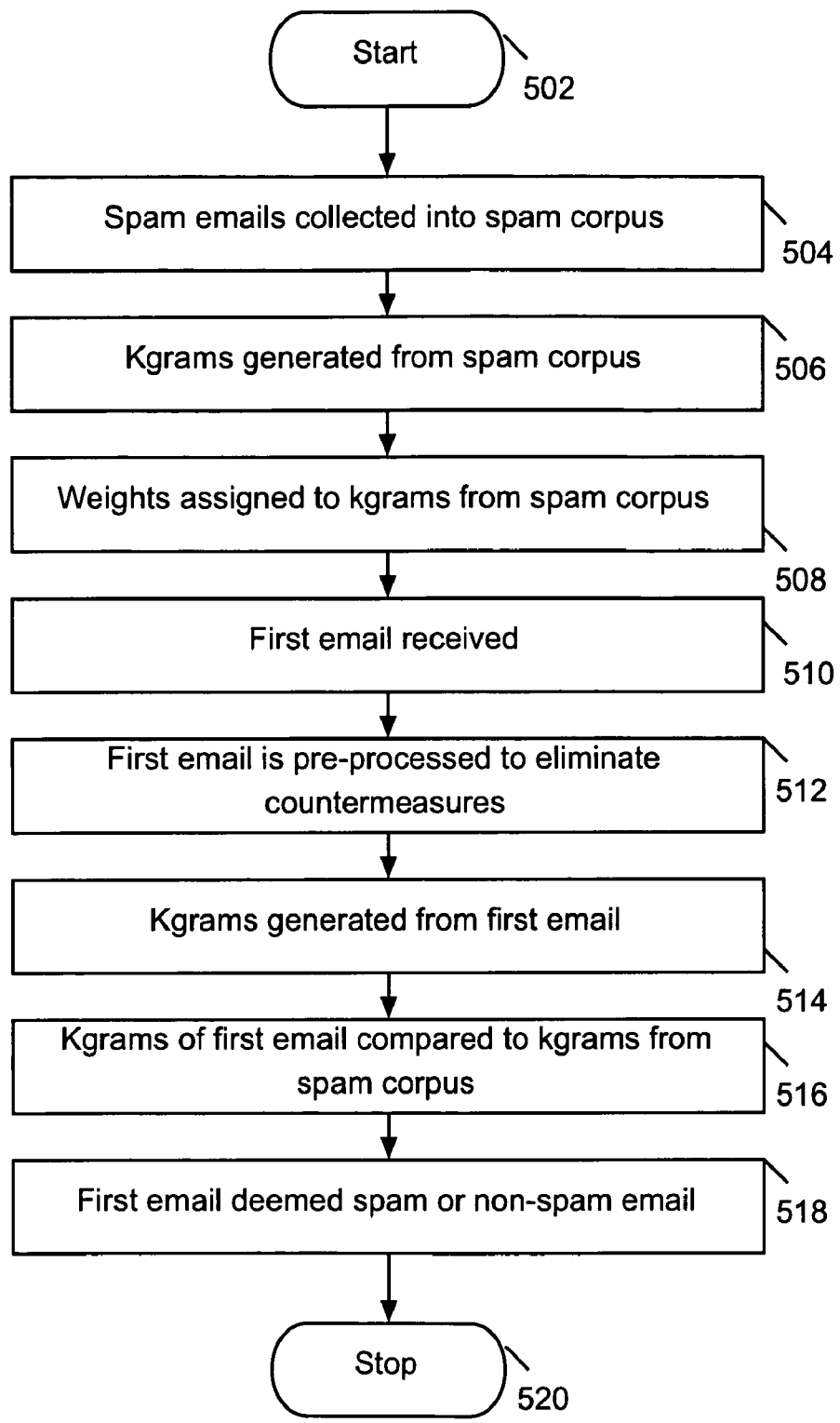
FIG. 5 is a flowchart showing the control flow of the process of detecting unsolicited e-mails using similarity calculations, according to one embodiment of the present invention.

FIG. 5 is a flowchart showing the control flow of the process of detecting unsolicited e-mails using similarity calculations, according to one embodiment of the present invention. FIG. 5 summarizes the process of detecting spam, as described above in greater detail. The control flow of FIG. 5 begins with step 502 and flows directly to step 504.

In step 504, a spam corpus 302 comprising a plurality of spam e-mails is generated by creating a bogus e-mail account where no e-mails are expected or solicited. Thus, any e-mails that are received by this e-mail account are deemed automatically to be, by definition, unsolicited e-mails, or spam. In step 506, the k-gram generator 304 generates k-grams from the spam corpus 302. For each spam e-mail in the spam corpus 302, the k-gram generator 304 generates at least one k-gram from the e-mail. Once k-grams are generated for all e-mail in the spam corpus 302, an exhaustive k-gram list or database 306 is created. This k-gram list 306 includes all k-grams generated from the entire spam corpus 302. In step 508, for each k-gram in the k-gram list 306, the k-gram generator 304 can generate a k-gram weight value corresponding to a k-gram. Once k-gram weight values are generated for all k-grams in the k-gram list 306, an exhaustive list or database 308 of k-gram weight values is created. This k-gram weight value list 308 includes a k-gram weight corresponding to each k-gram in the k-gram list 306.

In step 510, incoming e-mail 402 is received and in step 512, it is processed to determine whether it is a spam e-mail. Pre-processor 404 performs the tasks of pre-processing incoming e-mail 402 so as to eliminate spam-filtering countermeasures in the e-mail. After pre-processing by pre-processor 404, in step 514, the e-mail 402 is read by a k-gram generator 406. The k-gram generator 406 generates a set of k-grams for the incoming e-mail 402. This results in the creation of a k-gram list 412.

In step 516, this list is then read by the comparator 410, which compares the k-grams in k-gram list 412 with the k-grams in k-gram list 306. For each k-gram in k-gram list 412, comparator 410 does a byte-by-byte (or character-by-character) comparison with each k-gram in the k-gram list 306. I.e., the comparator 410 chooses a k-gram pair—one k-gram from the k-gram list 412 and one from the k-gram list 306—and does a byte-by-byte comparison. The comparator 410 performs this action for every possible k-gram pair of k-grams from the lists 412 and 306. The result 408 of the comparison process of the comparator 410 is a match if any of a variety of statements are found to be true (see above), such as an identical match between at least one k-gram pair. In step 518, based on whether there is a match in step 516, the incoming e-mail 402 is deemed to be either spam or non-spam e-mail. The incoming e-mail 402 can then be filed, viewed by the user, deleted, processed or included in the spam corpus 302, depending on whether or not it is determined to be spam. In step 520, the control flow of FIG. 5 stops.

The second class of spam classifier involves comparing tokens of an incoming e-mail to tokens in e-mail known to be spam. This class of classifier analyzes tokens in an incoming e-mail and compares them to the tokens present in spam. If a corpus of spam and white mail, i.e., non-spam or desirable e-mail, is provided to such a classifier, a spam-detecting process analyzes the tokens in an incoming e-mail. Examples of tokens are words or combination of words, web addresses, e-mail addresses, etc. These tokens can be given weights according to how undesirable or desirable, i.e., how spammy or non-spammy, they are. Spammy e-mail has a high spam or undesirability score while non-spam e-mail has a low spam, and hence highly desirable, score.

A token that occurs predominantly in spam would have high spammy weight and one which occurs predominantly in non-spam mail would be given high non-spam weight. A token which occurs in both might be ignored. Example of weight might be the fraction of e-mail having a token which is related to spam or non-spam. In an example case, this fraction represents the conditional probability that an e-mail is spam or non-spam given that a token is present in the e-mail. The spam detection module that utilizes the second class of spam classifier then analyzes the tokens present in the incoming e-mail and finds a list of tokens present there. The spam detection module would then determine a measure of how likely the incoming e-mail is spam.

An example of such a classifier is the Bayesian classifier, where the conditional probabilities are combined to get the probability that an e-mail is spam. Generally, a simplifying assumption is made that the probability of occurrence of tokens are independent of each other (i.e., there is no correlation between tokens) and in the example case the Bayesian classifier simply multiplies the conditional probabilities. There are other ways of measuring weights and combining weights to determine the "spam score" of an incoming mail. For example, each token is treated independently and co-occurrence of several tokens does not result in assigning different weights.

Figure 6:
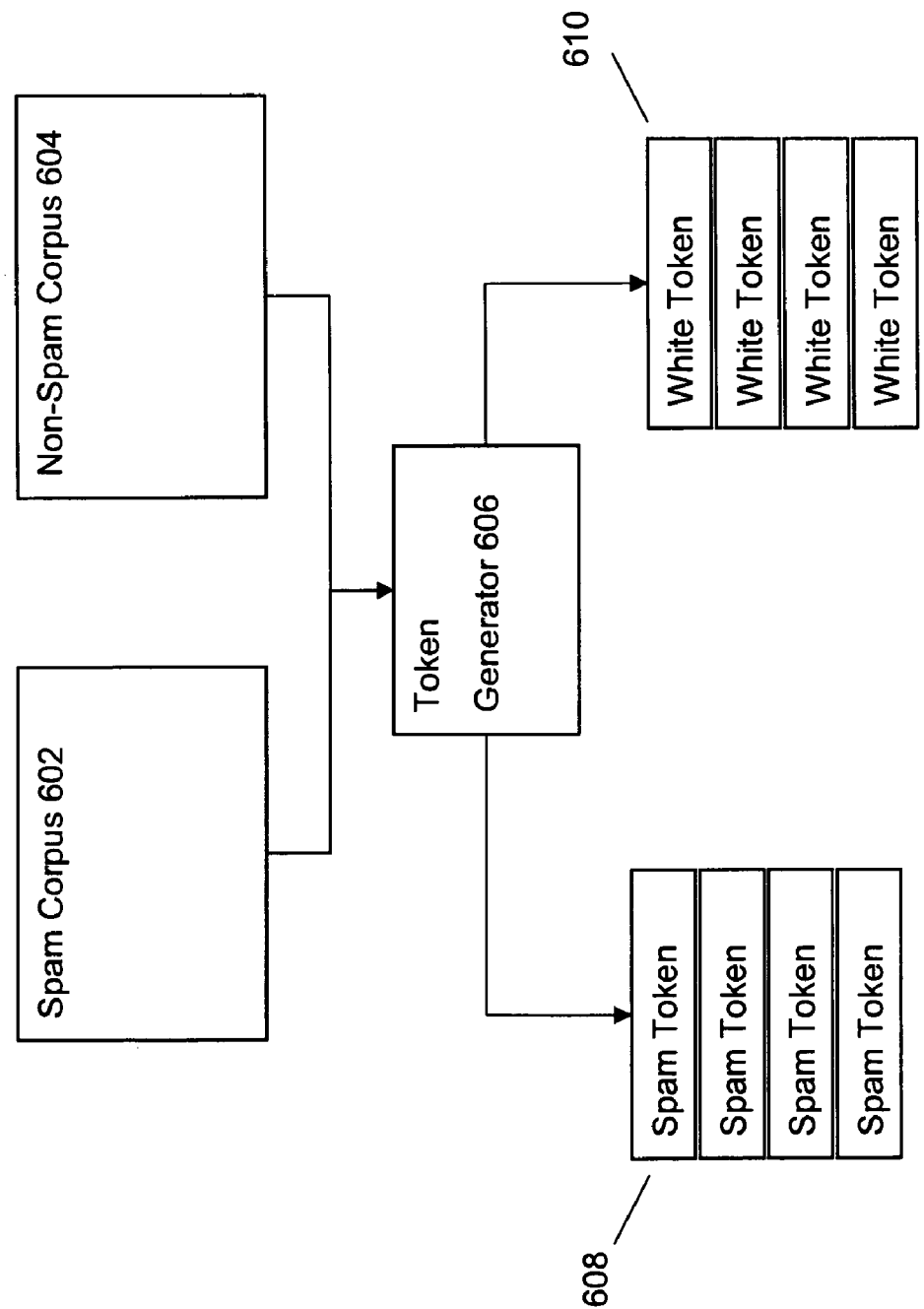
FIG. 6 is block diagram showing the generation of tokens from an unsolicited e-mail corpus and from a non-spam corpus, according to one embodiment of the present invention.

The use of the second class of spam classifier to detect spam is discussed in greater detail below with reference to FIG. 6 below. FIG. 6 is block diagram showing the generation of tokens from an unsolicited e-mail corpus 602 and from a non-spam corpus 604, according to one embodiment of the present invention. FIG. 6 shows a spam corpus 602 comprising a plurality of spam e-mails and a non-spam corpus 604 comprising a plurality of desirable e-mails. The spam corpus 602 is used to learn how to identify spam e-mail and distinguish it from non-spam e-mail. In one embodiment of the present invention, a spam corpus is generated by creating a bogus e-mail account, perhaps belonging to a fictitious person, where no e-mails are expected or solicited. Thus, any e-mails that are received by this e-mail account are deemed automatically to be, by definition, unsolicited e-mails, or spam.

FIG. 6 also shows a token generator 606. The token generator 606 generates tokens from the spam corpus 602 and the non-spam corpus 604. For each spam e-mail in the spam corpus 602, the token generator 606 generates at least one token from the e-mail and for each non-spam e-mail in the non-spam corpus 604, the token generator 606 generates at least one token from the e-mail. The process of generating tokens from an e-mail is described in greater detail above with reference to FIG. 2. Once tokens are generated for all e-mail in the spam corpus 602, an exhaustive token list or database 608 is created. This token list 608 includes all tokens generated from the entire spam corpus 602. The token list 608 acts like a dictionary for looking up tokens from an incoming e-mail and determining whether it is a spam e-mail. Likewise, once tokens are generated for all e-mail in the non-spam corpus 604, an exhaustive token list or database 610 is created. This token list 610 includes all tokens generated from the entire non-spam corpus 604. The token list 610 acts like a dictionary for looking up tokens from an incoming e-mail and determining whether it is a non-spam e-mail.

The third class of spam classifier involves using certain information of an incoming e-mail, such as the last routed server, to detect spam. For example, while spammers can spoof the sender address, they cannot change the last server from which the e-mail got to the recipient mail gateway. For example, it is possible to ascertain which server sent the e-mail to the recipient mail gateway. Certain protocols can be used to get information as to whom the sending server belongs. If this information is available, it is helpful in classifying the incoming e-mail. Even if this information is not available, common knowledge of the server that sent an incoming e-mail to the recipient server can be used to classify the e-mail. If a particular server is observed sending a lot of spam, any e-mail sent by that server can be assigned a high spam score. This is an example of using particular fields in an incoming e-mail to classify the e-mail.

Figure 7:
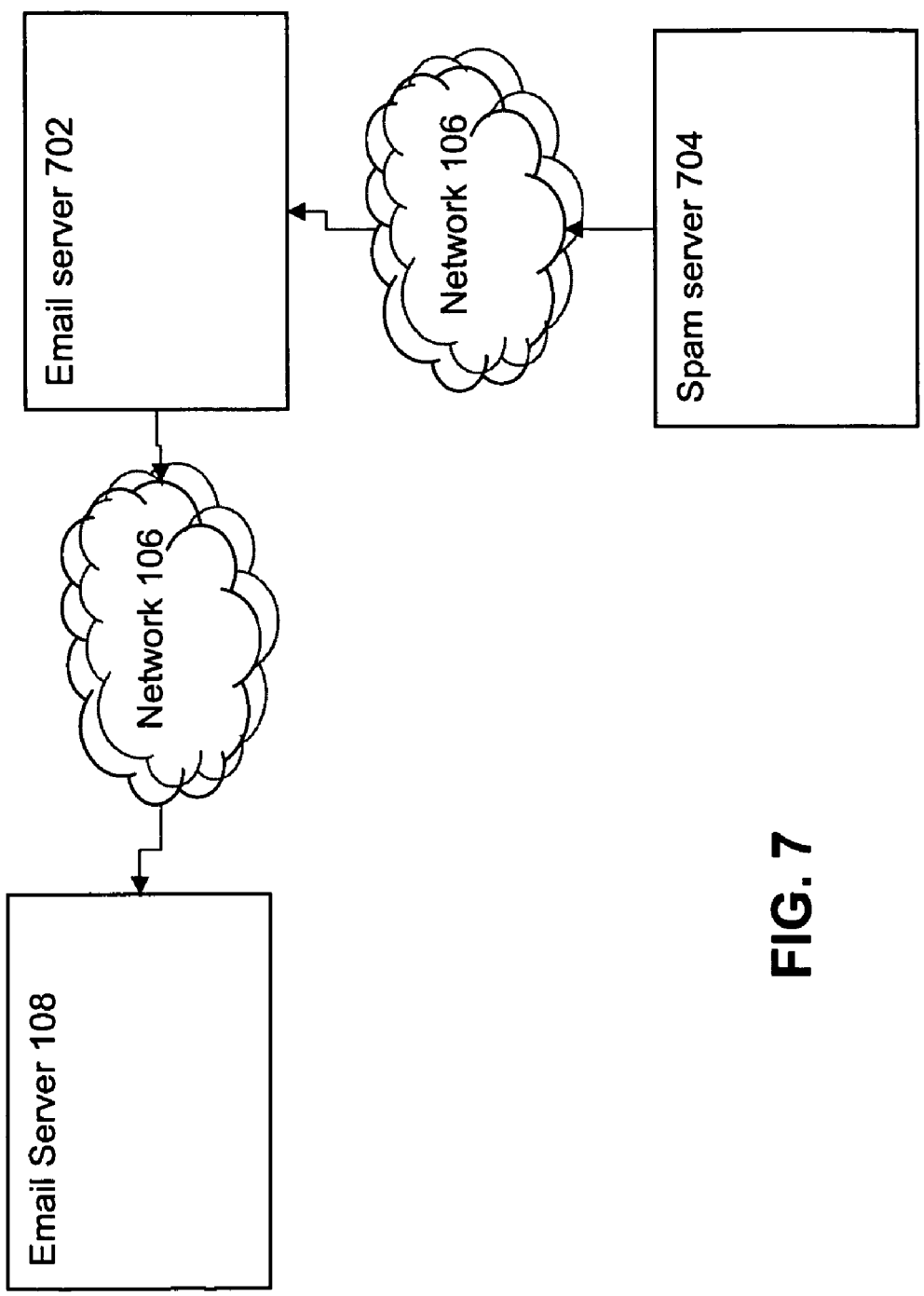
FIG. 7 is block diagram illustrating the use of the third class of spam classifier, according to one embodiment of the present invention.

The use of the third class of spam classifier to detect spam is discussed in greater detail below with reference to FIG. 7 below. FIG. 7 is block diagram illustrating the use of the third class of spam classifier, according to one embodiment of the present invention. As explained above, spammers cannot change the last server from which an e-mail got to the recipient mail gateway. For example, FIG. 7 shows a spam server 704 sending a spam e-mail to a recipient e-mail server 108. The spam e-mail travels from the spam server 704, through the network 106 to an e-mail server 702, again through the network 106 and ultimately to the e-mail server 108. Certain protocols can be used to get information as to whom the sending server 702 belongs. If this information is available, then the incoming e-mail can be classified as spam. Even if this information is not available, other knowledge of the server 702 can be used to classify the e-mail as spam.

As explained above, the present invention is directed towards the use of multiple spam classifiers to detect spam e-mail. Specifically, provided is a method for combining spam classifiers to result in a spam classifier that is better than any of its constituent classifiers at detecting spam. Different types of constituent classifiers used in spam detection are discussed above. How the present invention combines their output to yield a more effective classifier is now discussed.

The present invention allows an arbitrary set of different classifiers drawn from one or more classifier families to be combined into a combined classifier. The only requirement placed on a constituent classifier is that it should produce, for each input e-mail, an output score. The score may take several different forms. For example, the score could be a binary spam/non-spam classification, a ternary spam/non-spam/don't-know classification, an estimated probability that the input is spam, or a scalar score that is monotonically increasing or decreasing with the probability that the input is spam. It could even be a set of scalar scores, which can be characterized as a vector score. The combiner takes as input the set of scores from all of its constituent classifiers and applies a combination function to produce from this set of input scores an output score, which again can take on any of the above-mentioned forms, ranging from binary or ternary classification to an arbitrary scalar or vector score. In the case in which the combined classifier's score is not a classification, the final classification is computed by applying to the output score a simple function that maps it to a classification. As a simple example, the score might be a scalar, and the function might be a simple step function that classifies the input e-mail as spam if the score exceeds a given threshold, and classifies it as non-spam otherwise.

In a preferred embodiment of the invention, the constituent classifiers are chosen to be maximally disparate in nature—for example, one might choose one from the k-gram family of classifiers, a second from the Bayesian classifier family, and a third from a family of classifiers that examines the sending server. This policy has the advantage of minimizing correlations among scores generated by the constituent classifiers, making it more likely that the combined classifier can generate a more accurate and reliable classification. Alternatively, it is permissible to combine classifiers from the same family, but in this case care should be taken to reduce correlations among the classifier scores, for example by having the classifiers use very different parsing and/or rendering methods to do the initial processing of the input e-mail. Even if the constituent classifiers output different, apparently incommensurate types of score, e.g. one outputs a binary classification, the second outputs a score, and the third outputs a probability, their outputs can be made commensurate by converting them all to numerical values. For example, the binary "non-spam"/"spam" classification can be converted to 0/1, and the score and the probability outputs can be left as is, as they are already numerical. If one of the outputs is ternary (i.e. "non-spam", "spam", and "don't know"), then 0/1 conversion again applies; the classifier's output can simply be excluded when it outputs a "don't know", and the combined classifier makes use of the remaining classifiers' inputs (an example of how it does so is provided below).

The heart of the combined classifier invention is the combination function. In greatest generality, the combiner function may be an arbitrary nonlinear scalar or vector function of the scores of the constituent classifiers. In a preferred embodiment, the combiner function is generated automatically by analyzing the scores of the constituent classifiers on a corpus of e-mail M, each sample of which is labeled as non-spam or spam. (In an alternative embodiment, the label associated with a given e-mail could be a continuous variable representing the degree to which that e-mail is deemed spam, as opposed to a binary spam/non-spam label.) The mail corpus M may come from a variety of sources, including user votes and honeypots. Suppose that N classifiers are being combined, and that each generates a single scalar score. Then the set of scores for any given e-mail can be regarded as a point in an N-dimensional space, and a separator that separates the non-spam and span mail in that N-dimensional space is sought.

A simple example of such separator is an (N−1)-dimensional plane, or a line when there are two classifiers (N=2). A suitable combination function in the latter case would be the equation of that line of separation, of the form $C(S_1, S_2) = w_1 S_1 + w_2 S_{2-1}$, where $S_1$ and $S_2$ represent the scores of the two constituent classifiers. The classification resulting from the combination function $C(S_1, S_2)$ would be "spam" if $C(S_1, S_2) > 0$ and "non-spam" otherwise. In general, the choice of where to draw the line of separation between non-spam and spam e-mail, which is determined by the values of the weights $w_1$ and $w_2$, depends upon one's relative concern about false positives and false negatives. In spam filtering, false positives are typically much less desirable than false negatives. That is, classifying a spam e-mail as non-spam and delivering it to the recipient is preferred over classifying a non-spam e-mail as spam and failing to deliver it to the recipient. One can reduce false positives by lowering the weights, but this comes at the expense of increasing false negatives, or reducing the spam detection rate. In general, even when the number of classifiers is greater than two and/or the combination function is non-linear (and hence the non-spam/spam separator is a nonlinear curve), there will be ways of adjusting the separator curve to realize different tradeoffs between false positives and false negatives, and administrators or individual users of spam filters will want to have the ability to control this tradeoff.

In a preferred embodiment, the tradeoff between false positives and false negatives is controlled as follows. First, a penalty function P(M; C), which is a function of a given classifier C and a given labeled e-mail corpus M, is defined. Second, the best classifier C* is selected by an optimization procedure that explores the space of possible combination functions, possibly subject to constraints on functional form, to identify the combination function C* that minimizes the penalty function P(M; C) subject to those constraints.

In a second preferred embodiment, which is an extension of the first embodiment, a set of penalty functions covering a typical spectrum of user tradeoffs are chosen, and a best classifier C* computed for each. One or more users of the anti-spam system can then select the penalty function that most closely expresses their desired false-positive vs. false-negative tradeoff, and the system will use the pre-computed best classifier for that penalty function. In a third preferred embodiment, which is an extension of the second embodiment, a user can specify any desired penalty function, and the system will identify a penalty function that most closely matches it from among those in the set for which best classifiers were computed; the system will use the classifier associated with the best-match penalty function for that user. In a fourth preferred embodiment, which is another extension of the second embodiment, the user specifies any desired penalty function, and the system computes a weighted sum of pre-computed penalty functions that most closely matches the desired penalty function. The weights $w_i$ for the i.sup.th penalty function are retained. The best classifier for that user is then computed as the weighted sum of the best classifiers for each of the pre-computed penalty functions, using the same weights $w_i$ for the classifier $C_{i*}$ associated with the $i^{th}$ penalty function.

In the second and third preferred embodiments described above, the user may wish to specify their false-positive vs. false-negative curve directly, rather than via a penalty function. This is accomplished by recording the false positive and false negative rates associated with each best classifier, displaying them as a set of points (fp, fn) on a two-dimensional graph, and allowing the user to choose the preferred point, which is mapped to the associated classifier. In the fourth preferred embodiment described above, the same set of points (fp, fn) is displayed to the user, and the user is permitted to specify a desired maximum false positive rate, and the system uses interpolation to obtain a combined classifier that meets that false positive objective while minimizing false negatives. A simple alternative allows the user to specify a desired maximum false negative rate, and the system uses interpolation to obtain a combined classifier that meets the false negative objective while minimizing false positives.

In a preferred embodiment, the class of penalty functions may be parameterized by a single parameter $\pi$. In this preferred embodiment, the penalty function P(M; C, $\pi$) is the false negative rate plus a penalty weight $\pi$ times the false positive rate. More precisely, P(M; C, $\pi$)=fp+$\pi$fn, where fp is the fraction of non-spam e-mails in corpus M that classifier C misclassifies as spam and fn is the fraction of spam e-mails in the corpus M that classifier C misclassifies as non-spam. A perfect classifier (unattainable in practice due to the underlying imperfections in the constituent classifiers) would yield a penalty value of zero. This functional form for the penalty function is convenient because it allows for a wide spectrum of tradeoffs by sweeping through a range of values of $\pi$. Thus, in the second, third and fourth embodiments described above, each member of the set of penalty functions can be specified by its associated scalar value $\pi$. In practice, this allows a user to specify a point in the spectrum of tradeoffs by inputting a single parameter (either $\pi$ itself or some transformation of it), for example by using a slider bar or other standard graphical user interface.

In a preferred embodiment, the optimization procedure that selects the best classifier C* is as follows. The set of allowed classifiers is parameterized by a set of basis functions and parameters w, possibly with some set of constraints on the w. Then, the best combination function is found by any of a number of standard optimization algorithms that are well known in the art. The chosen optimization algorithm searches the parameter space w to find a best point w* that minimizes P(w, M; π), and the combination function C* corresponding to w* is selected.

For example, if C=2 and the set of basis functions is restricted to be linear functions of the scores of the constituent classifiers, then the combination function can be parameterized in terms of weights was $C(S_1, S_2; w_1, w_2)=w_1 S_1+w_2 S_{2-1}$, the function that was cited above, except that the dependence upon the weights w is made explicit. Another more complex parameterization that can capture some degree of nonlinearity for an arbitrary number of constituent classifiers is $C(S_1, S_2, \ldots, S_N)=w_1 f_1(S_1)+w_2 f_2(S_2)+ \ldots +w_N f_N(S_N)-1$, where the basis functions $f_i$ are arbitrary fixed functions of a single variable. For example, the function $f_i$ might be a nonlinear warping of the score $S_i$ designed to transform the output score $S_i$ into a probability $f_i(S_i)$ that an e-mail receiving that score is spam. The nonlinear basis function $f_i$ would be computed empirically by correlating the score versus the observed probability of spam among all e-mails with that score. A still more complex parameterization is one in which the basis functions $f_i$ are themselves parameterized; for example all of the basis functions $f_i(S)$ might include two extra parameters that define the center and width of a sigmoid; in this case the number of parameters in the set w would be 3N. If desired, constraints could reduce the number of parameters; for example if all basis functions $f_i(S)$ were constrained to be sigmoids with identical centers and widths, then the total number of parameters in w would simply be N+2. Other nonlinear parameterizations could include functional forms in which there are cross terms, as in $C(S_1, S_2; w_1, w_2, w_3)=w_1 S_1+w_2 S_2+w_3 S_1 S_{2-1}$. If the output scores of all of the constituent classifiers are probabilities, then other natural forms of nonlinear combination functions that may be considered include multiplying all of the scores together, or computing their maximum or minimum. These and other techniques for combining probabilities have been discussed in the literature.

In the most general case, the optimization algorithm will handle nonlinear objective functions, and will preferably be derivative-free, i.e. it will not require information about the derivatives of its objective function (the penalty function). A preferred example of a nonlinear derivative-free optimizer suitable for the purpose is the Amoeba algorithm described in Numerical Recipes (Press, Flannery, Teukolsky, Vetterling, Cambridge University Press, 1989). The Amoeba nonlinear optimization algorithm can be improved in this application by running it for several trials and choosing the best outcome of the best trial.

As will be understood by practitioners of the art, alternate procedures that do not entail optimization can be used to derive a best combined classifier. For example, the combined classifier could be expressed as a decision tree that takes as input the individual scores of the constituent classifiers and possibly auxiliary data extracted from the content of the e-mail message, and produces as output a classification. In this case, the best combined classifier would be obtained by standard techniques for learning decision trees. Other techniques, such as support vector machines, can be used as well.

If one or more of the constituent classifiers produces a "don't know" output, the combined classifier can deal with this absence of input(s) by training separate combined classifiers for subsets of the constituent classifiers. For example, if a combined classifier combines outputs from three classifiers A, B, and C, and both A and B can produce "don't know" outputs, then in addition to training a combined classifier for (A,B,C), three other combined classifiers can be trained: (A,C), (B,C), and C (in case both A and B fail for the same message). The training and usage of these combined classifiers can be performed exactly as described in the foregoing description. Alternatively, the combined classifiers for a given subset can be derived from heuristics applied to trained combined classifiers that include extra classifiers not included in the given subset, for example by renormalizing the weights of the classifiers appropriately. The present invention includes a system that employs the appropriate combined classifier for each message, depending on whether any classifiers produce a definite output.

Figure 12:
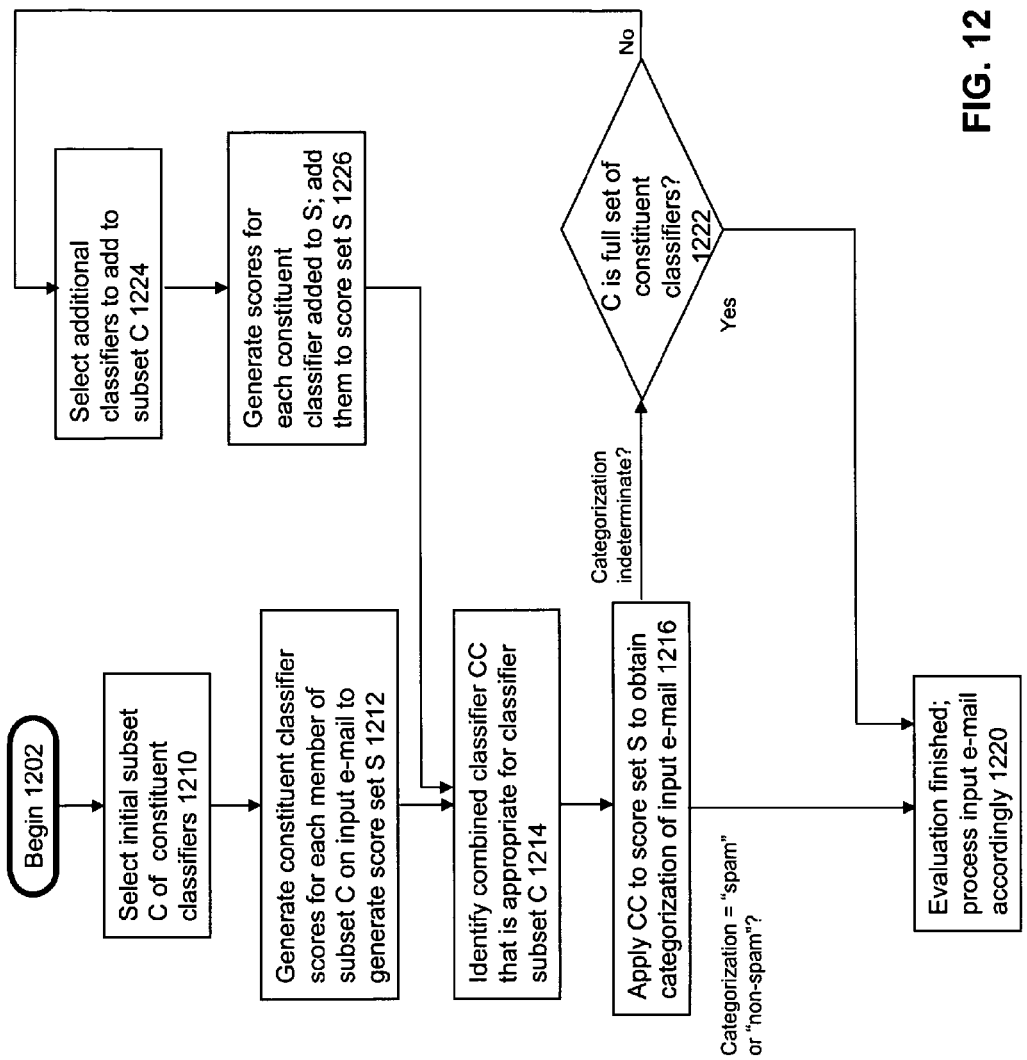
FIG. 12 is a flowchart showing the control flow of the process of categorizing a given input e-mail, according to one embodiment of the present invention.

When some constituent classifiers are significantly more computationally expensive than others, it is possible to gain computational efficiency without sacrificing an undue amount of classification accuracy by using only a subset of the constituent classifiers to evaluate the input e-mail, at least initially. FIG. 12 is a flowchart showing the control flow of the process of categorizing a given input e-mail, according to one embodiment of the present invention. The control of FIG. 12 begins with step 1202, and control flows directly to step 1210.

At step 1210, an initial subset C of the constituent classifiers is chosen. The initial subset C is typically chosen to consist of classifiers that are individually accurate and/or computationally inexpensive. Control then passes to step 1212, at which the given input e-mail to be categorized is input to each member of the classifier subset C and a score is generated by each. The constituent classifier scores are collected into a score set S. Control then passes to step 1214, at which a classifier CC appropriate to the classifier subset C is identified. The appropriate combined classifier CC may be computed by the method described in FIG. 10 as applied to the subset C, or it may be generated by a heuristic transformation of a combined classifier computed for a subset of classifiers deemed sufficiently similar to C. Control then passes to step 1216.

At step 1216, the combined classifier CC is applied to the score set S to obtain a categorization of the input e-mail into either "spam", "non-spam", or "indeterminate". In a preferred embodiment, the categorization is obtained by computing a combined classification score S'. If S' is below a first specified threshold, the input e-mail is categorized as non-spam. If S' is above a second specified threshold (typically different from the first specified threshold), then the input e-mail is categorized as spam. If S' lies between the first and second specified thresholds, its categorization is indeterminate. If the category derived at step 1216 is either "spam" or "non-spam", then control passes to step 1220, marking the end of the evaluation process, at which point the input e-mail is processed as appropriate. Otherwise, if the category derived in step 1216 is indeterminate, control passes to step 1222.

At step 1222, a check is performed to determine whether there are any more constituent classifiers that might be applied to the input e-mail to resolve the indeterminacy in its classification. If there are not, control passes to step 1220, marking the end of the evaluation process, and an appropriate action is taken. For example, the e-mail may be placed in a temporary waiting queue, where it may be reevaluated later in hopes that the constituent classifiers or the combined classifiers will improve to the point where the e-mail can be categorized more definitively. If there are more constituent classifiers, control passes to step 1224.

At step 1224, additional classifiers that have not yet been included in the classifier subset C are chosen. The selection may be based on a fixed set of secondary classifiers, or it may be derived dynamically on the basis of a score S' generated by the combined classifier during step 1216, or on the score set S, or on computational complexity considerations, or other individual criteria or combinations of these criteria. Control then passes to step 1226, at which the constituent classifiers added to the classifier subset C in step 1224 are applied to the input e-mail, and the scores for each newly added classifier added to the score set S. Control then passes to step 1214, where a new combined classifier appropriate to the new classifier subset C is identified, and the flow continues as shown in FIG. 12 until it finally terminates at step 1220.

In order to be adaptive to the ever-changing nature of spam and to the ever changing performance of individual constituent classifiers as they adapt to spam, the combined classifier will need to be retrained from time to time. The retraining may be performed at some specified time interval, or after a given number of new messages have been added to the corpus M, e.g. from new votes by users of the spam filtering system. It may alternatively be triggered by some event, such as a command from a system administrator, or a signal indicating that one of the constituent classifiers is starting to perform poorly. The retraining itself may simply be a re-execution from scratch of the training procedures that have been described above applied to the corpus M, or it may be applied to a subset of the corpus M, such as the most recent n messages in M. Alternatively, various incremental training methods that achieve the same result as a full retraining might be employed. For example, one could record a running total of false positives and false negatives in a corpus M for each penalty function. Then, when messages are added to or removed from the corpus to form a new corpus M', one can simply adjust the false positive and false negative tallies to reflect the added or removed messages, and re-compute the penalty values from these tallies.

Figure 8:
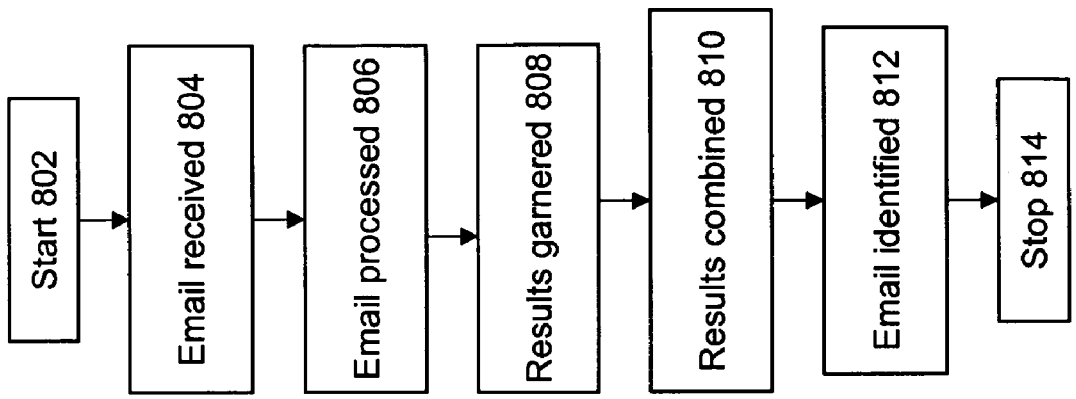
FIG. 8 is a flowchart showing the control flow of the process of detecting unsolicited e-mails using classifier combination techniques, according to one embodiment of the present invention.

FIG. 8 is a flowchart showing the control flow of the process of detecting unsolicited e-mails using classifier combination techniques, according to one embodiment of the present invention. The control flow of FIG. 8 begins with step 802 and flows directly to step 804.

In step 804, an incoming e-mail is received and in step 806, it is processed to determine whether it is a spam e-mail. In step 806, more than one classifier is executed upon the incoming e-mail to determine whether it is spam. Three types of spam classifiers and the manner in which they are executed are discussed above in greater detail. In step 808, the results, i.e., the scores, of the execution of the multiple classifiers upon the incoming e-mail are garnered. In step 810, the scores are combined using a combination technique as described in greater detail above, resulting in one final score.

In step 812, based on the score of step 810, the incoming e-mail is categorized. In a preferred embodiment, the categorization consists of deeming an given e-mail as either spam or non-spam e-mail. The incoming e-mail can then be filed, viewed by the user, deleted, processed or included in a spam corpus, depending on whether or not it is determined to be spam. In a second preferred embodiment, the range of possible categorizations output by the classifier may be extended to include "indeterminate" as well as "spam" and "non-spam". In this case, several possible actions may ensue when an input e-mail is categorized as "indeterminate". One action is to place the e-mail in a waiting queue, with the intent of attempting to categorize the e-mail again at a later time. Later, the constituent classifiers or the combined classifier may have adapted to new information, such as the arrival of additional explicit spam/non-spam votes from users, or new mail arriving at honeypots, which can be assumed to be spam. Therefore, after some specified period of time, or upon the detection of specified events such as the receipt of a given amount of new mail or the detection of sufficient change in the constituent or the combined classifiers, re-running the classifier(s) may yield a more definitive categorization of the input e-mail. Another possible action is to immediately input the e-mail to a second classifier in the hope that it will be able to resolve the indeterminacy. In step 814, the control flow of FIG. 8 stops.

Figure 10:
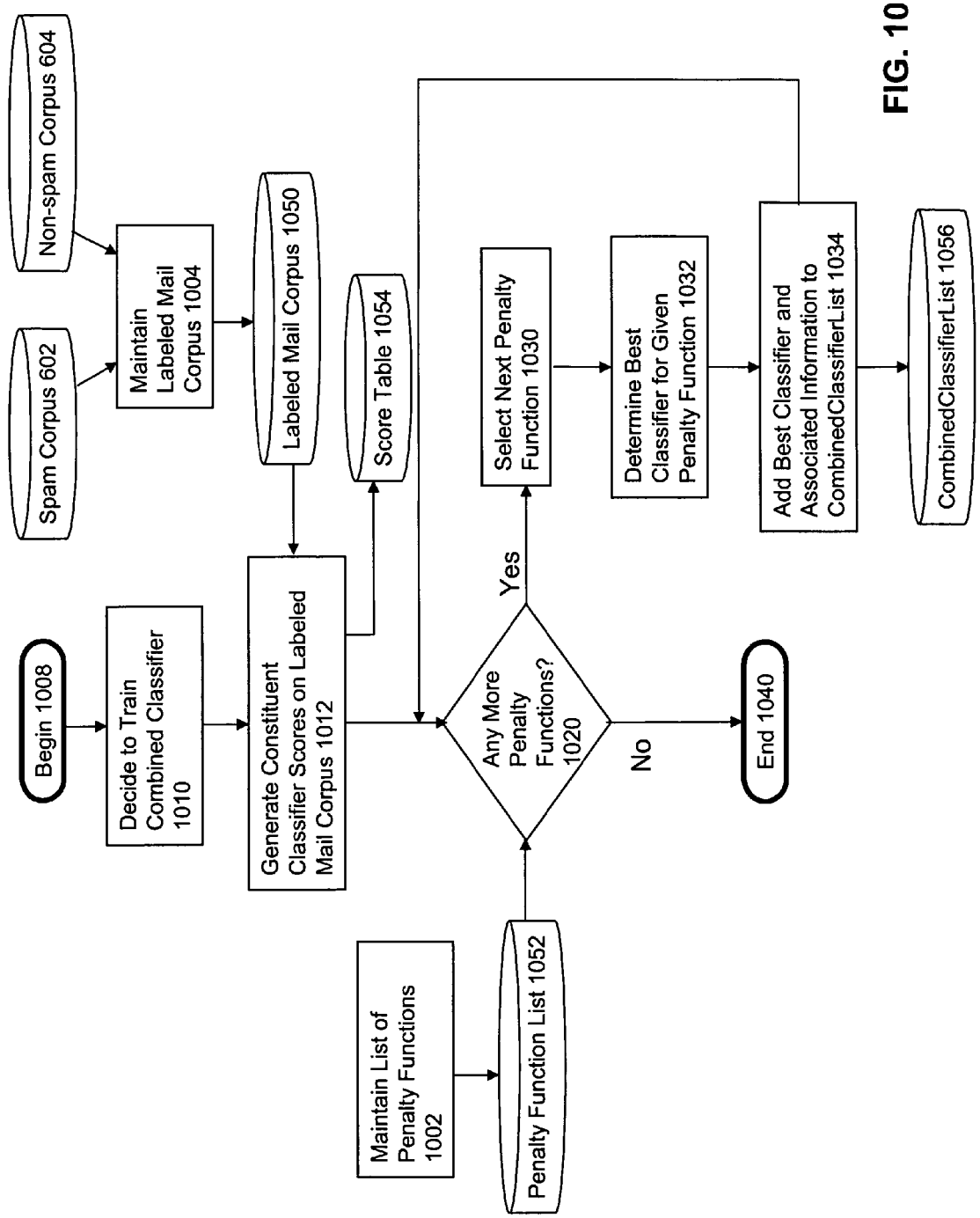
FIG. 10 is a flowchart showing the control flow of the process of training or retraining the combined classifier, according to one embodiment of the present invention.

FIG. 10 is a flowchart showing the control flow of the process of training or retraining the combined classifier, according to one embodiment of the present invention. The control flow of FIG. 10 begins with step 1008 and flows directly to step 1010.

In step 1010, a decision is made to train (or retrain) the combined classifier. This decision may be based upon manual input from an administrator or user, a periodically generated signal, or a signal based upon detection of a special condition under which training or retraining of the combined classifier is deemed necessary. An example of one such special condition is one or more constituent classifiers having adapted sufficiently since the last training of the combined classifier. Another example is a sufficient amount of new mail having been added to or deleted from the labeled mail corpus 1050. Once the decision is made to train or retrain the combined classifier, flow passes to step 1012.

In step 1012, a score is obtained for each of the constituent classifiers applied to each mail in the labeled mail corpus 1050, and the results are recorded in a score table 1054. The score table may be generated by running the classifiers, or by looking up previously computed classifier scores in a table, or via some combination of these or other approaches. Having generated the score table 1054, control passes to step 1020.

The labeled mail corpus 1050 is maintained by a step 1004 that is performed periodically and asynchronously from the main flow of FIG. 10. In step 1004, the spam corpus 602 and the non-spam corpus 604 are merged into a labeled mail corpus. The merging may include deleting sufficiently old mail. Additionally, the merging may be accomplished only in a virtual sense, for example by listing identities of mails in the spam corpus 602 and the non-spam corpus 604 that are to be regarded as belonging to the labeled mail corpus.

In step 1020, a list of one or more penalty functions 1052 is checked to determine whether there are any for which a combined classifier still needs to be computed. If so, a penalty function for which a combined classifier has not yet been computed is selected from the list of penalty functions 1052 at step 1030. If there are no more penalty functions for which a combined classifier remains to be computed, the flow terminates at step 1040.

The list of one or more penalty functions 1052 is maintained by a step 1002 that is performed at some time prior to the execution of the main flow of FIG. 10. The list may be predetermined, or established and possibly altered from time to time by a user or administrator, or it may be automatically generated from a set of expressed false positive vs. false negative tradeoffs that typify the user population.

Once a next penalty function has been selected at step 1030, control passes to step 1032, at which a best classifier for the selected penalty function is determined based on information included in the score table 1054. The determination of the best classifier may be based upon an optimization algorithm that minimizes the penalty function applied to the score table 1054, or upon a decision tree, support vector machine, or other algorithm. Auxiliary information derived during the process of deriving the best classifier, such as the expected false positive and false negative rates, are associated with the best classifier. Upon determination of the best classifier for the selected penalty function, control passes to step 1034.

In step 1034, the best classifier determined in step 1032 is added, along with a description of the penalty function for which it was derived, as well as information on associated false positive and false negative rates for that best classifier, to a CombinedClassifierList 1056. Control then passes back to step 1020, and the process continues until it finally terminates at step 1040.

Figure 11:
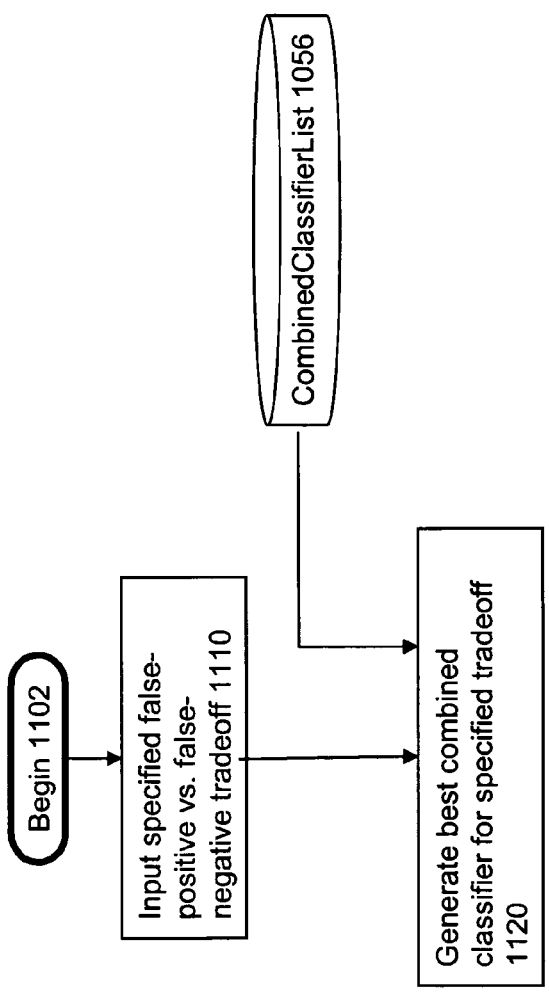
FIG. 11 is a flowchart showing the control flow of the process of generating a best combined classifier for a specified false-positive vs. false-negative tradeoff, according to one embodiment of the present invention.

FIG. 11 is a flowchart showing the control flow of the process of generating a best combined classifier for a specified false-positive vs. false-negative tradeoff, according to one embodiment of the present invention. The control flow of FIG. 11 begins with step 1102 and flows directly to step 1110.

In step 1110, a specified false-positive vs. false-negative tradeoff is input by an administrator or user. The input may be solicited and received in a variety of ways, including selecting a highest permissible false positive rate, or selecting a desired false-positive:false-negative penalty ratio. Another possible means of input is to display to the user a false-positive vs. false-negative curve and allow the user to select via an input device such as a mouse a desired point on that curve. In the latter case, the displayed false-positive vs. false-negative curve may be generated from the CombinedClassifierList 1056, using stored information about combined classifiers and their associated false-positive and false-negative rates.

In step 1120, a best combined classifier for the specified false-positive vs. false-negative tradeoff is computed. One method of computation is to identify the combined classifier in CombinedClassifierList 1056 that has the false-positive rate or false-positive vs. false-negative tradeoff that most closely matches the specified false-positive vs. false-negative tradeoff. Another reasonable alternative is to identify a small number of most closely matching false-positive vs. false-negative tradeoffs in CombinedClassifierList 1056 and use interpolation among this small set of matches to obtain a best classifier. The generated best classifier is subsequently used for classifying the user's e-mail. The control flow depicted in FIG. 11 may be instigated whenever a different false-positive vs. false-negative tradeoff is specified, or a sufficient change in the CombinedClassifierList 1056 is detected to occur.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which, when loaded in a computer system, is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 9:
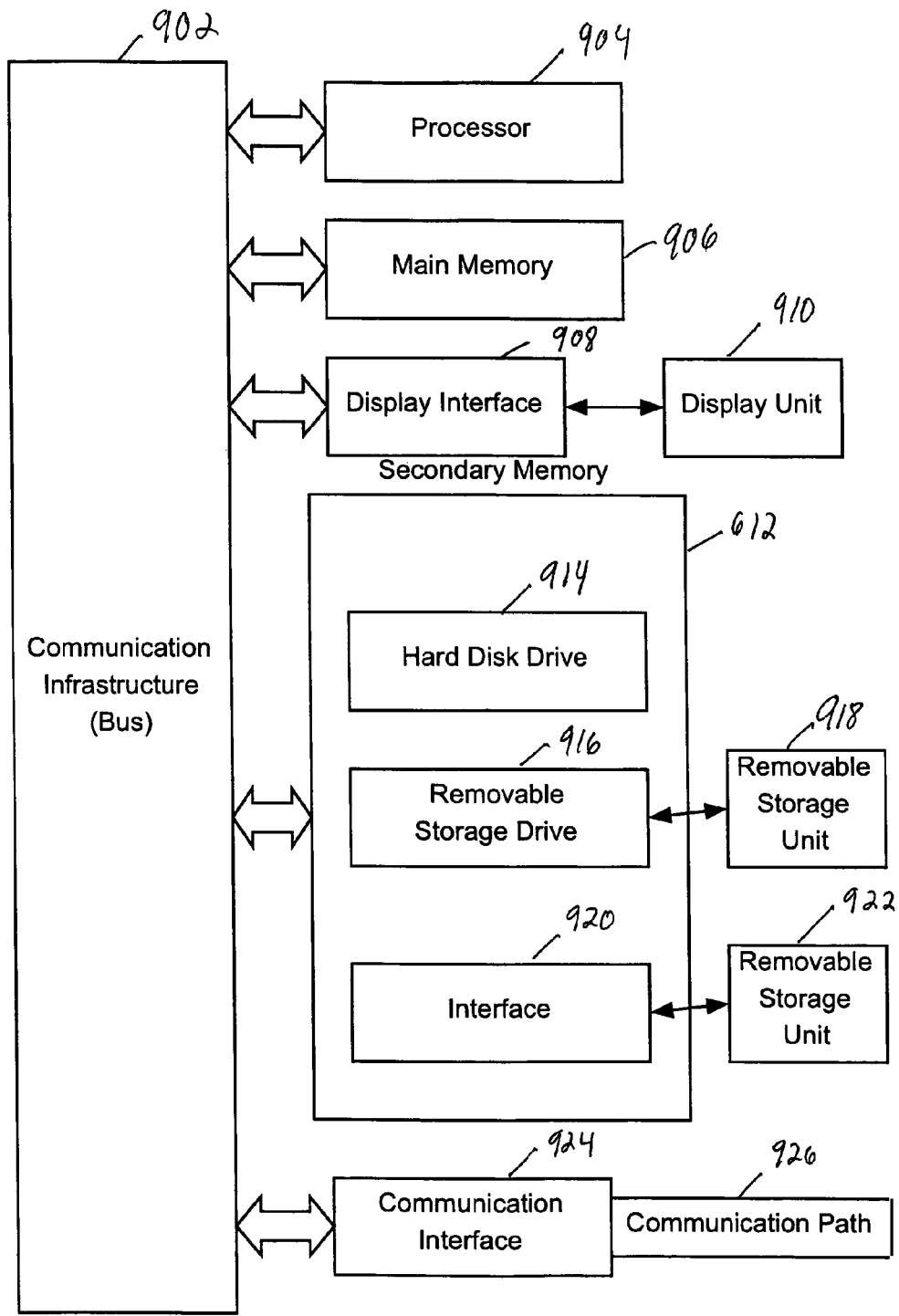
FIG. 9 is a high level block diagram showing an information processing system useful for implementing one embodiment of the present invention.

FIG. 9 is a high level block diagram showing an information processing system useful for implementing one embodiment of the present invention. The computer system includes one or more processors, such as processor 904. The processor 904 is connected to a communication infrastructure 902 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 908 that forwards graphics, text, and other data from the communication infrastructure 902 (or from a frame buffer not shown) for display on the display unit 910. The computer system also includes a main memory 906, preferably random access memory (RAM), and may also include a secondary memory 912. The secondary memory 912 may include, for example, a hard disk drive 914 and/or a removable storage drive 916, representing a floppy disk drive, a magnetic tape drive, an optical disk drive, etc. The removable storage drive 916 reads from and/or writes to a removable storage unit 918 in a manner well known to those having ordinary skill in the art. Removable storage unit 918, represents a floppy disk, a compact disc, magnetic tape, optical disk, etc. which is read by and written to by removable storage drive 916. As will be appreciated, the removable storage unit 918 includes a computer readable medium having stored therein computer software and/or data.

In alternative embodiments, the secondary memory 912 may include other similar means for allowing computer programs or other instructions to be loaded into the computer system. Such means may include, for example, a removable storage unit 922 and an interface 920. Examples of such may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to the computer system.

The computer system may also include a communications interface 924. Communications interface 924 allows software and data to be transferred between the computer system and external devices. Examples of communications interface 924 may include a modem, a network interface (such as an Ethernet card), a communications port, a PCMCIA slot and card, etc. Software and data transferred via communications interface 924 are in the form of signals which may be, for example, electronic, electromagnetic, optical, or other signals capable of being received by communications interface 924. These signals are provided to communications interface 924 via a communications path (i.e., channel) 926. This channel 926 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 906 and secondary memory 912, removable storage drive 916, a hard disk installed in hard disk drive 914, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 906 and/or secondary memory 912. Computer programs may also be received via communications interface 924. Such computer programs, when executed, enable the computer system to perform the features of the present invention as discussed herein. In particular, the computer programs, when executed, enable the processor 904 to perform the features of the computer system. Accordingly, such computer programs represent controllers of the computer system.

The described embodiments of the present invention are advantageous as they allow for the quick and easy identification of unsolicited e-mails. This results in a more pleasurable and less time-consuming experience for consumers using e-mail programs to manage their e-mails. Another advantage of the present invention is that it provides more accurate identification of spam e-mails than any single spam classification method. Another advantage of the present invention is that it is more robust against unsolicited-e-mail-filtering countermeasures employed by senders of unsolicited e-mails. Such countermeasures may be effective against one constituent classifier, at least temporarily, but they are much less likely to work against all of the constituent classifiers simultaneously. Another advantage of the present invention is that it offers users a broad spectrum from conservative to aggressive filtering, permitting them to choose explicitly a tradeoff between increasing the probability of detecting spam and decreasing the probability of falsely identifying legitimate e-mail as spam. This results in increased usability and user-friendliness of the e-mail program being used by the consumer.

Another advantage of the present invention is the development of a spam-detecting system that is largely immune to the addition, deletion or modification of content in an incoming e-mail. Through the use of k-grams, or signatures, the present invention is able to detect a spam e-mail even if it has been altered in a variety of ways. This is beneficial as it results in the increased detection of spam e-mail.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A method of detecting whether a first e-mail is undesirable, the method comprising: inputting the first e-mail to each of a plurality of constituent spam classifiers; obtaining at least one score from each of the plurality of constituent spam classifiers indicating the degree to which the first e-mail is deemed spam; obtaining a combined spam score from a combined spam classifier that takes as input the at least one score from the plurality of constituent spam classifiers, the combined spam classifier being computed automatically in accordance with a false-positive vs. false-negative tradeoff; and identifying the first e-mail as an undesirable e-mail if the combined spam score indicates that the first e-mail is undesirable; wherein step of computing the combined spam classifier comprises: compiling a labeled e-mail corpus consisting of a plurality of e-mails that have been labeled according to the degree to which the plurality of e-mails are deemed to be spam; computing scores of the plurality of constituent spam classifiers on each e-mail in the labeled e-mail corpus; establishing a set of one or more sample false-positive vs. false-negative tradeoffs; analyzing, for each sample false-positive vs. false-negative tradeoff, the computed scores of the plurality of constituent spam classifiers on each e-mail in the labeled e-mail corpus to compute a set of combined spam classifiers, each of which best achieves a corresponding sample false-positive vs. false-negative tradeoff; selecting a false-positive vs. false-negative tradeoff; and computing from the false-positive vs. false-negative tradeoff, a set of sample false-positive vs. false-negative tradeoffs and a set of corresponding best combined classifiers a best combined classifier for the false-positive vs. false-negative tradeoff, and wherein the false-positive vs. false-negative tradeoffs are specified by penalty functions, and the combined spam classifier associated with a given penalty function is computed by an optimization procedure that yields the combined spam classifier for which the value of the given penalty function is minimal on the labeled e-mail corpus.

2. The method of claim 1, wherein the step of computing the combined spam classifier comprises: compiling a labeled e-mail corpus comprising a plurality of e-mails that have been labeled according to a degree to which the plurality of e-mails are deemed to be spam; computing scores of the plurality of constituent spam classifiers on each e-mail in the labeled e-mail corpus; and analyzing the computed scores of the plurality of constituent spam classifiers on each e-mail in the labeled e-mail corpus to compute a combined spam classifier that best achieves the specified false-positive vs. false-negative tradeoff.

3. The method of claim 1, wherein the space of possible classifiers is represented by a set of parameterized weights and basis functions, and the optimization procedure searches the parameterized weight space to identify the combined spam classifier for which the given penalty function is minimal on the labeled e-mail corpus.

4. The method of claim 3, wherein the optimization algorithm is a nonlinear derivative-free optimization algorithm.

5. The method of claim 3, wherein the basis functions are individual output scores of the constituent spam classifiers.

6. The method of claim 3, wherein the basis functions are fixed transformations of individual output scores of the constituent spam classifiers.

7. The method of claim 3, wherein the basis functions are parameterized transformations of individual output scores of the constituent spam classifiers, and parameters are included in the search conducted by the optimization algorithm.

8. The method of claim 1, wherein the combined spam score is a numerical value and the combined spam score is considered to be undesirable if it exceeds a specified threshold.

9. The method of claim 1, wherein the at least one score from each of the plurality of constituent spam classifiers is any one of numerical and categorical and includes an output indicating that a constituent spam classifier is unable to assign a definite score.

10. The method of claim 1, wherein the combined spam classifier is recomputed any one of periodically at a specified time interval, in response to a command, and in response to an automatically generated signal.

11. The method of claim 10, wherein the labeled e-mail corpus is updated to include new labeled e-mail and to delete old labeled e-mail when the combined spam classifier is recomputed.

12. The method of claim 10, wherein the automatically generated signal indicates that one or more of the plurality of constituent spam classifiers has changed significantly due to adaptation.

13. The method of claim 10, wherein the automatically generated signal indicates that one or more of the plurality of constituent spam classifiers is performing poorly.

14. The method of claim 1 wherein the false-positive vs. false-negative tradeoff is determined by displaying to a user a set of pairs of estimated false-positive and false-negative rates and allowing the user to select one of the pairs.

15. The method of claim 1, wherein the penalty functions are parameterized by a single parameter that establishes a ratio between a penalty for false positives and a penalty for false negatives.

16. A method for detecting undesirable e-mail, the method comprising: inputting a first e-mail to each of a plurality of constituent spam classifiers; obtaining at least one score from each of the plurality of constituent spam classifiers indicating the degree to which the first e-mail is deemed spam; obtaining a combined spam score from a combined spam classifier that takes as input the at least one score from each of the plurality of constituent spam classifiers, at least one of the plurality of constituent spam classifiers being a member of a similarity-detection family; and identifying the first e-mail as an undesirable e-mail if the combined spam score indicates that the first e-mail is undesirable; wherein step of computing the combined spam classifier comprises: compiling a labeled e-mail corpus consisting of a plurality of e-mails that have been labeled according to the degree to which the plurality of e-mails are deemed to be spam; computing scores of the plurality of constituent spam classifiers on each e-mail in the labeled e-mail corpus; establishing a set of one or more sample false-positive vs. false-negative tradeoffs; analyzing, for each sample false-positive vs. false-negative tradeoff, the computed scores of the plurality of constituent spam classifiers on each e-mail in the labeled e-mail corpus to compute a set of combined spam classifiers, each of which best achieves a corresponding sample false-positive vs. false-negative tradeoff; selecting a false-positive vs. false-negative tradeoff; and computing from the false-positive vs. false-negative tradeoff, a set of sample false-positive vs. false-negative tradeoffs and a set of corresponding best combined classifiers a best combined classifier for the false-positive vs. false-negative tradeoff, and wherein the false-positive vs. false-negative tradeoffs are specified by penalty functions, and the combined spam classifier associated with a given penalty function is computed by an optimization procedure that yields the combined spam classifier for which the value of the given penalty function is minimal on the labeled e-mail corpus.

17. A non-transitory computer readable medium including computer instructions for detecting whether a first e-mail is undesirable, the computer instructions including instructions for: inputting the first e-mail to each of a plurality of constituent spam classifiers; obtaining at least one score from each of the plurality of constituent spam classifiers indicating the degree to which the first e-mail is deemed spam; obtaining a combined spam score from a combined spam classifier that takes as input the at least one score from the plurality of constituent spam classifiers, the combined spam classifier being computed automatically in accordance with a false-positive vs. false-negative tradeoff; and identifying the first e-mail as an undesirable e-mail if the combined spam score indicates that the first e-mail is undesirable; wherein step of computing the combined spam classifier comprises: compiling a labeled e-mail corpus consisting of a plurality of e-mails that have been labeled according to the degree to which the plurality of e-mails are deemed to be spam; computing scores of the plurality of constituent spam classifiers on each e-mail in the labeled e-mail corpus; establishing a set of one or more sample false-positive vs. false-negative tradeoffs; analyzing, for each sample false-positive vs. false-negative tradeoff, the computed scores of the plurality of constituent spam classifiers on each e-mail in the labeled e-mail corpus to compute a set of combined spam classifiers, each of which best achieves a corresponding sample false-positive vs. false-negative tradeoff; selecting a false-positive vs. false-negative tradeoff; and computing from the false-positive vs. false-negative tradeoff, a set of sample false-positive vs. false-negative tradeoffs and a set of corresponding best combined classifiers a best combined classifier for the false-positive vs. false-negative tradeoff, and wherein the false-positive vs. false-negative tradeoffs are specified by penalty functions, and the combined spam classifier associated with a given penalty function is computed by an optimization procedure that yields the combined spam classifier for which the value of the given penalty function is minimal on the labeled e-mail corpus.

18. An information processing system for detecting whether a first e-mail is undesirable, comprising: a processor configured for: inputting the first e-mail to each of a plurality of constituent spam classifiers; obtaining at least one score from each of the plurality of constituent spam classifiers indicating the degree to which the first e-mail is deemed spam; obtaining a combined spam score from a combined spam classifier that takes as input the at least one score from the plurality of constituent spam classifiers, the combined spam classifier being computed automatically in accordance with a false-positive vs. false-negative tradeoff; and identifying the first e-mail as an undesirable e-mail if the combined spam score indicates that the first e-mail is undesirable; wherein step of computing the combined spam classifier comprises: compiling a labeled e-mail corpus consisting of a plurality of e-mails that have been labeled according to the degree to which the plurality of e-mails are deemed to be spam; computing scores of the plurality of constituent spam classifiers on each e-mail in the labeled e-mail corpus; establishing a set of one or more sample false-positive vs. false-negative tradeoffs; analyzing, for each sample false-positive vs. false-negative tradeoff, the computed scores of the plurality of constituent spam classifiers on each e-mail in the labeled e-mail corpus to compute a set of combined spam classifiers, each of which best achieves a corresponding sample false-positive vs. false-negative tradeoff; selecting a false-positive vs. false-negative tradeoff; and computing from the false-positive vs. false-negative tradeoff, a set of sample false-positive vs. false-negative tradeoffs and a set of corresponding best combined classifiers a best combined classifier for the false-positive vs. false-negative tradeoff, and wherein the false-positive vs. false-negative tradeoffs are specified by penalty functions, and the combined spam classifier associated with a given penalty function is computed by optimization procedure that yields the combined spam classifier for which the value of the given penalty function is minimal on the labeled e-mail corpus.

* * * * *